No. 676,987. Patented June 25, 1901.
P. T. J. LANGBEIN.
RADIAL DRILLING AND TAPPING MACHINE.
(Application filed Sept. 2, 1898.)
(No Model.) 6 Sheets—Sheet 1.
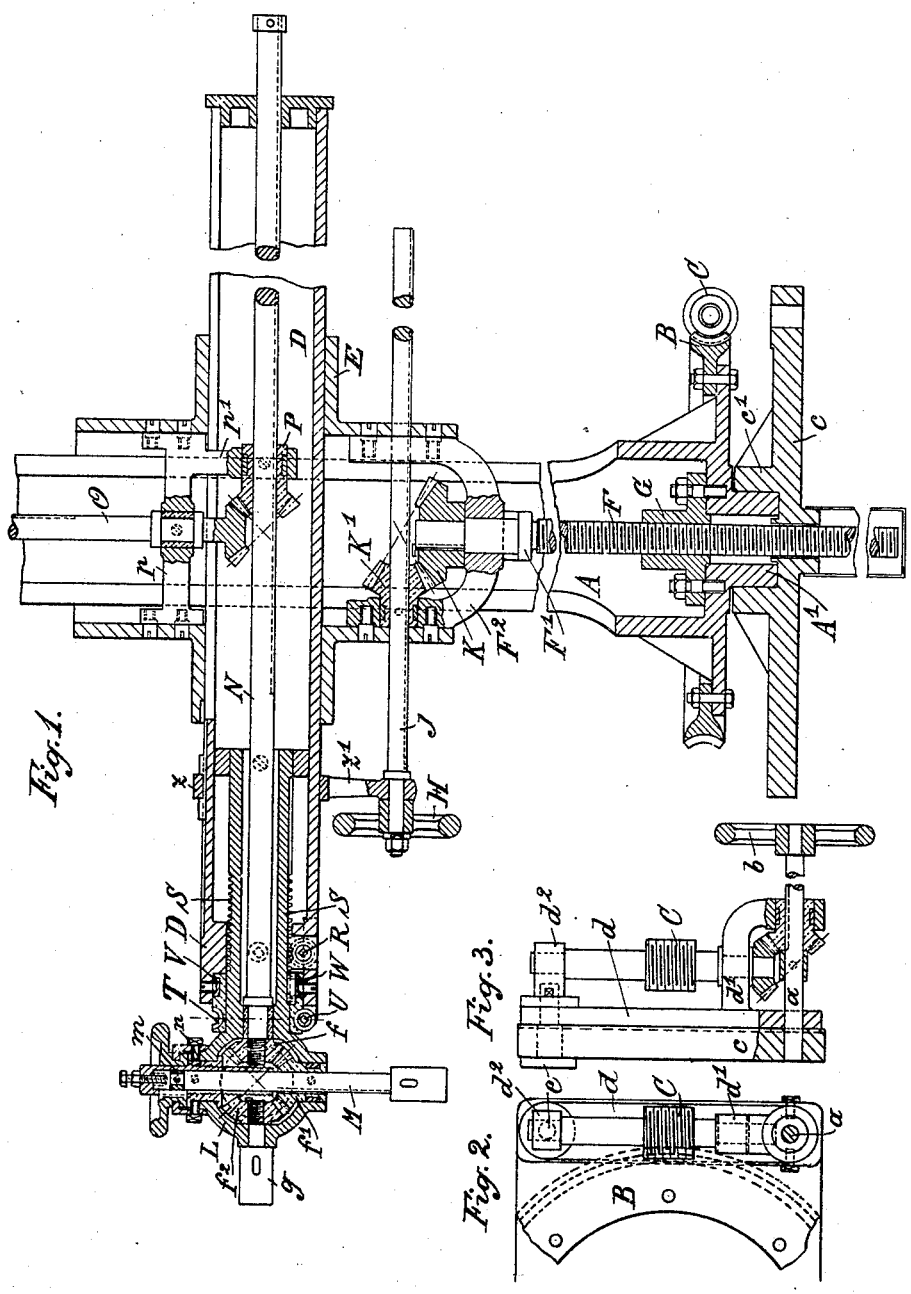

No. 676,987. Patented June 25, 1901.
P. T. J. LANGBEIN.
RADIAL DRILLING AND TAPPING MACHINE.
(Application filed Sept. 2, 1898.)
(No Model.) 6 Sheets—Sheet 2.
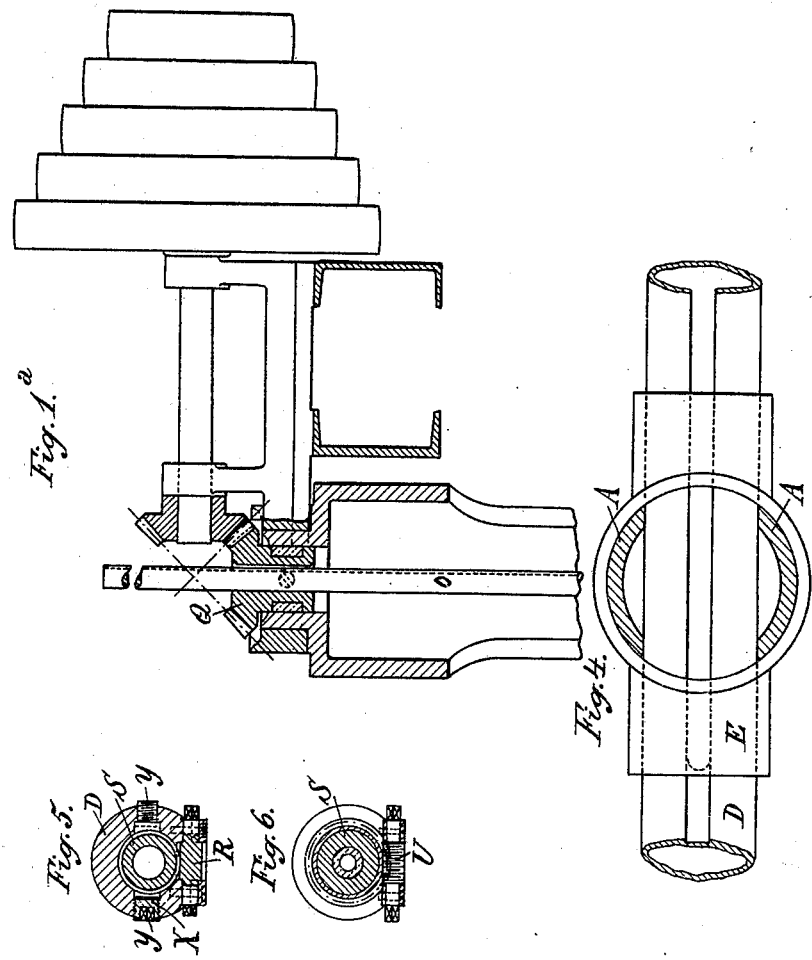

No. 676,987. Patented June 25, 1901.
P. T. J. LANGBEIN.
RADIAL DRILLING AND TAPPING MACHINE.
(Application filed Sept. 2, 1898.)
(No Model.) 6 Sheets—Sheet 3.

No. 676,987. Patented June 25, 1901.
P. T. J. LANGBEIN.
RADIAL DRILLING AND TAPPING MACHINE.
(Application filed Sept. 2, 1898.)
(No Model.) 6 Sheets—Sheet 4.
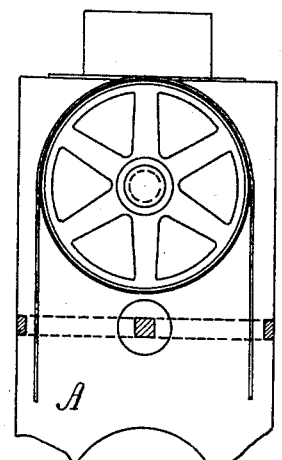
Fig. 10.
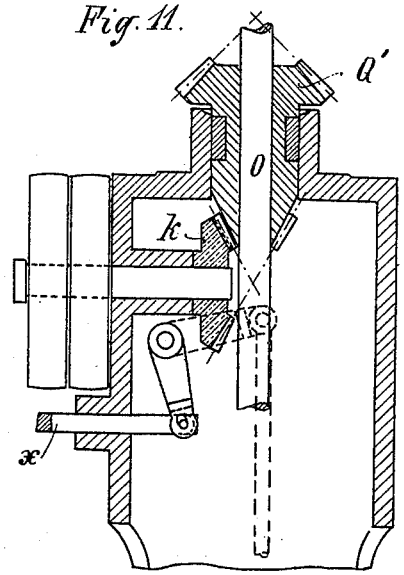
Fig. 11.
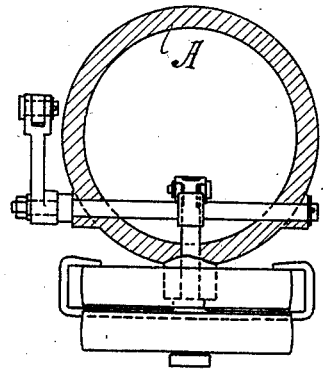
Fig. 12.
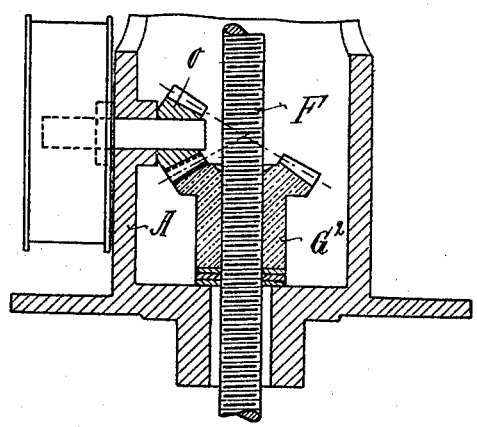

No. 676,987. Patented June 25, 1901.
P. T. J. LANGBEIN.
RADIAL DRILLING AND TAPPING MACHINE.
(Application filed Sept. 2, 1898.)
(No Model.) 6 Sheets—Sheet 5.
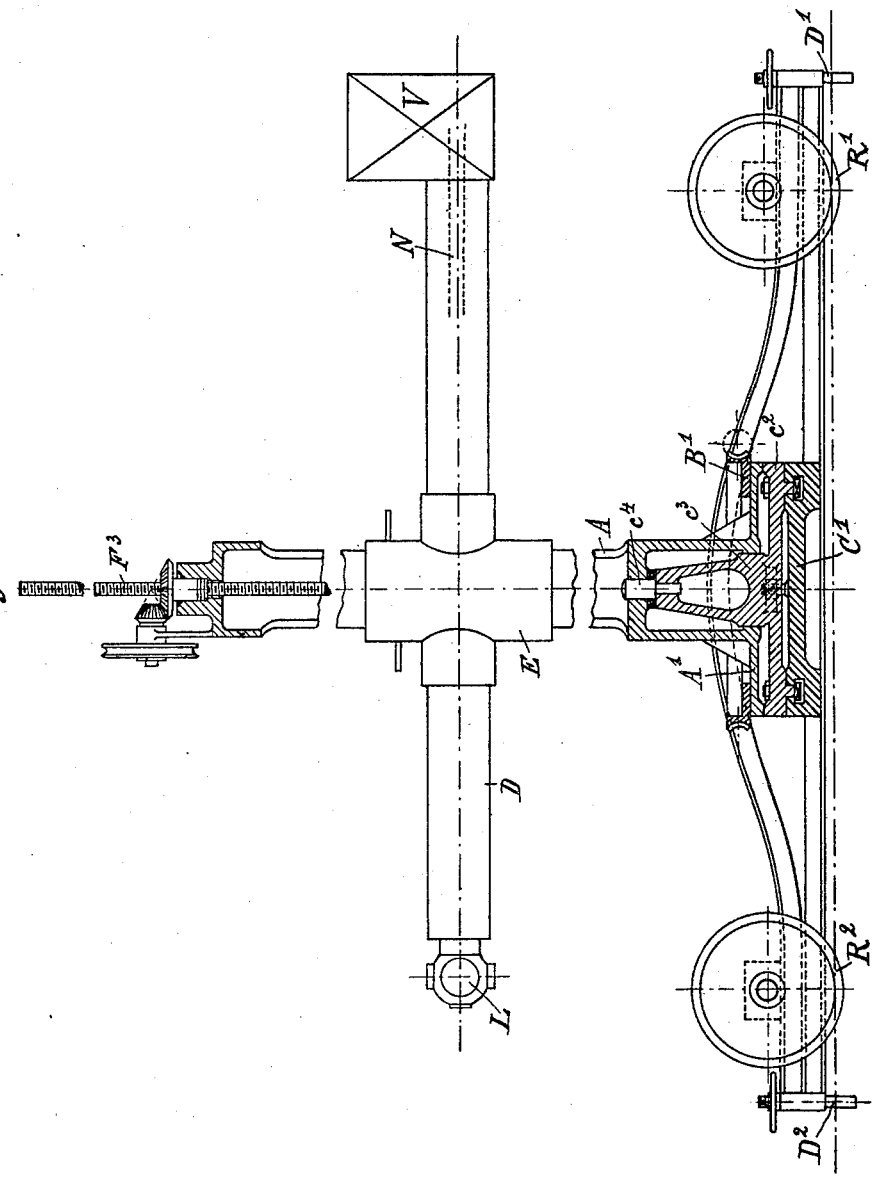

No. 676,987. Patented June 25, 1901.
P. T. J. LANGBEIN.
RADIAL DRILLING AND TAPPING MACHINE.
(Application filed Sept. 2, 1898.)
(No Model.) 6 Sheets—Sheet 6.
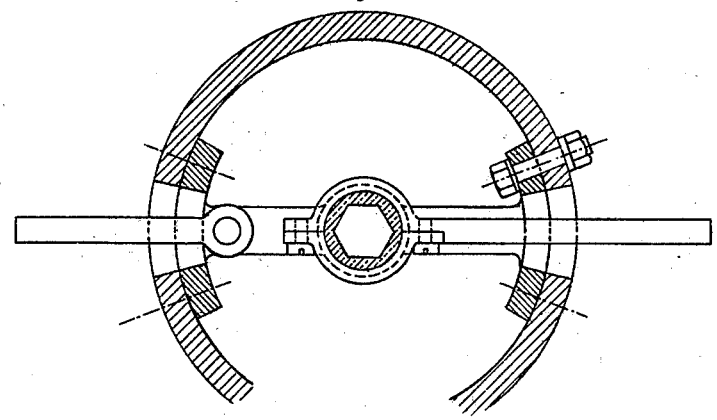
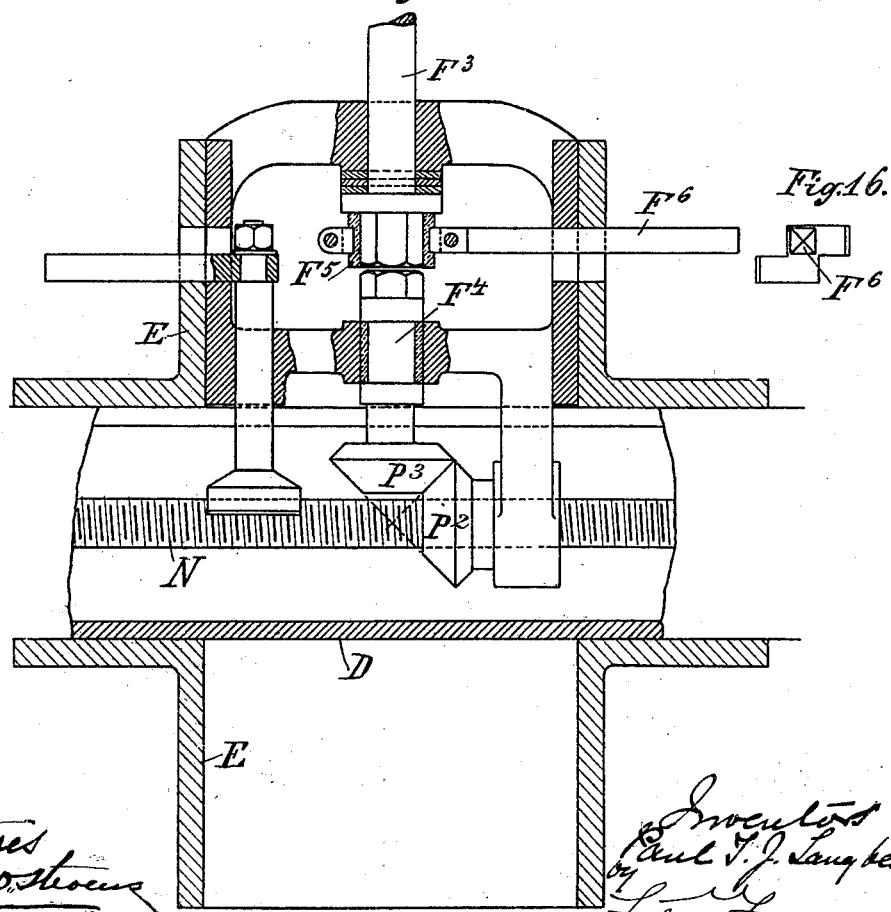

UNITED STATES PATENT OFFICE.

PAUL THEODOR JOSEPH LANGBEIN, OF SARONNO, ITALY.

RADIAL DRILLING AND TAPPING MACHINE.

SPECIFICATION forming part of Letters Patent No. 676,987, dated June 25, 1901.

Application filed September 2, 1898. Serial No. 690,116. (No model.)

*To all whom it may concern:*

Be it known that I, PAUL THEODOR JOSEPH LANGBEIN, of Saronno, in the Kingdom of Italy, have invented certain new and useful Improvements in Radial Drilling and Tapping Machines, (for which a patent has been applied for in Germany, dated August 9, 1898,) of which the following is a specification.

My invention relates to improvements in radial drilling and tapping machines by means of which the operating-tool can always be brought into the required position whatever that of the surface to be worked upon may be.

My invention is best understood by means of the accompanying drawings, in which—

Figure 7:
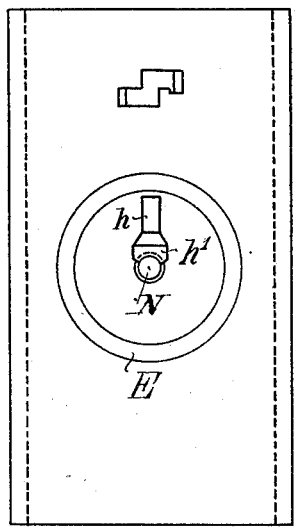
Figure 8:
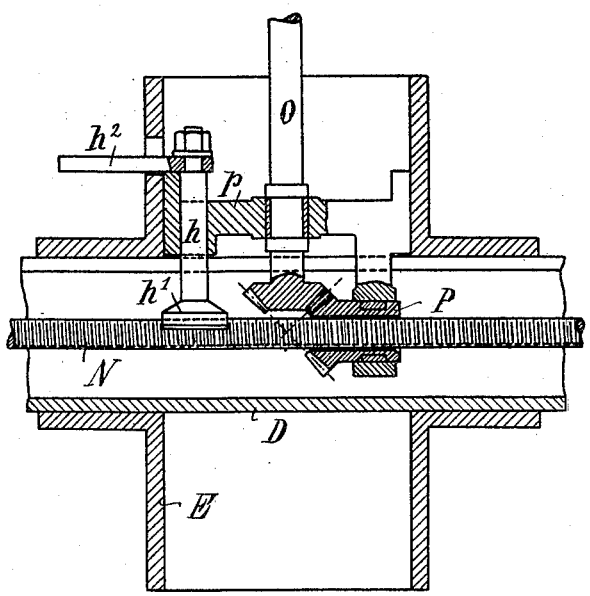
Figure 9:
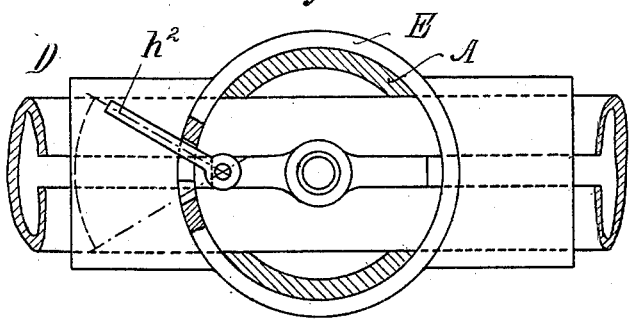

Figures 1 and 1ª are sectional elevations of the machine, and Figs. 2 to 6 details of same. Figs. 7, 8, and 9 show a modification embodying the automatic driving devices employed when horizontal displacements of large extent of the radial arm have to be effected. Figs. 10, 11, and 12 show the automatic arrangement employed when vertical displacements of large extent of the radial arm have to be effected. Fig. 13 is a modification of the machine, whereby it is rendered portable and electrically driven. Figs. 14, 15, and 16 are details of the machine shown in Fig. 13.

The hollow pillar A, having two longitudinal slots which are diametrically opposite each other, is provided at its lower end with a hollow extension A', which fits in a cup $c'$, forming part of the bed-plate $c$. The lower part of pillar A has cast on it a flange, to which is attached a crown B, having cut on it helical teeth, so as to form a worm-wheel gearing with the worm C. When the latter is rotated, the whole machine can turn around its vertical axis. The shaft of which worm C forms part rests in bearings $d'$ $d^2$, fixed to a common base-plate $d$, Figs. 2 and 3, and is actuated by means of bevel-wheels rotated by the hand-wheel $b$ on the vertical spindle $a$. The bevel-wheel on this spindle is so arranged that it cannot move in a vertical direction, while the spindle can slide through it. Base-plate $d$ can turn horizontally around a vertical pin $e$, provided under bearing $d^2$. When screw C meshes with worm-wheel B, spindle $a$ passes through a suitable hole provided in the bed-plate $c$. Spindle $a$, which is capable of moving up and down vertically, can be lifted out of the hole in the bed-plate, so that when it is desired to put the worm and worm-wheel out of gear base-plate $d$ is turned outward around pin $e$.

The foot of the hollow pillar is fitted with a socket G, provided internally with a screw-thread and acting as a fixed nut for the vertical screw-spindle F. The upper end of the latter passes through a cross-piece F², which bears against a shoulder F', and carries the transverse support E, which can slide up and down on pillar A. The upper extremity of spindle F is fitted with a bevel-wheel K, meshing with the bevel-wheel K' on the horizontal spindle J. On rotating the latter by means of the hand-wheel H a rotary motion is imparted to bevel-wheel K, and consequently to spindle F, which screws itself either upward or downward through socket G, according to the direction of the rotation, transverse support E moving accordingly either upward or downward on pillar A. Spindle J is provided with a longitudinal groove which fits over a feather in the hub of bevel-wheel K'. At one of its outer ends and just in front of hand-wheel H spindle J is supported by a bracket Z', attached to a ring Z, capable of sliding on radial arm D and fitted with a projection entering a groove on said arm.

The transverse support E carries a hollow radial arm D, which can slide therein, and is fitted with a central shaft N, imparting motion to the tool and resting in bearings at both ends of the radial arm. On this shaft is a bevel-wheel P, the bearing of which is fitted in a bracket $p'$, forming part of a cross-piece $p$, attached to transverse support E. A rotary motion is imparted by bevel-wheel P to spindle N by means of a feather fitting in a longitudinal groove in said spindle. The cross-piece $p$ forms also a bearing for the vertical spindle O, the lower end of which is fitted with a bevel-wheel gearing with P. This vertical spindle is provided with a longitudinal groove fitted over a feather in the hub of a bevel-wheel Q, fitted in the top of the pillar and imparting motion to said spindle. The horizontal shifting of hollow arm D within transverse support E is in the arrangement shown in Fig. 1 done by hand.

The rotary motion imparted by suitable gearing to spindle O and from the latter to spindle N and bevel-wheel $f$, keyed thereon inside the drill-head L, actuates through bevel-wheel $f'$ the drill-spindle M, and eventually through bevel-wheel $f^2$ another drill-spindle $g$, the connection between bevel-wheel $f'$ and spindle M being effected by means of a groove and feather. Spindle M revolves and is suspended within a socket $m$, provided with an external screw-thread fitting the internal thread of a bush $n$, fixed to the drill-head L. Socket $m$ is closed at its upper end and fitted above the threaded part with a hand-wheel and a screw for adjusting the pressure on drill-spindle M. By turning this hand-wheel the socket $m$ and spindle M are screwed up or down in the drill-head.

Drill-head L is provided with a tubular extension S, by means of which it is connected to the radial arm D and can be shifted within the latter or turned around its axis. The first motion is obtained by means of a small spur-wheel R, whose teeth gear with rings provided on the periphery of the tubular extension S and having a cross-section which is of the same shape as the teeth. Fig. 5 is a cross-section of this arrangement. When the drill-head has been adjusted to the required exact position, extension S is fixed therein by means of clamping-jaws and pressure-screws. In order to revolve the drill-head around its horizontal center line, a worm-wheel T is provided, which is connected by a feather W and groove to the extension S, so as to be capable to turn therewith. As shown in Fig. 6, which is a section of this arrangement, worm-wheel T and tubular extension S, to which it is attached, are set in rotation by the worm U.

It will be understood from the foregoing that the following adjustments can be made: First, the whole machine can be revolved around its vertical axis; second, the transverse support E can be raised and lowered; third, the radial arm D can be shifted horizontally within the transverse support; fourth, the drill-head L can be adjusted horizontally in the radial arm D; fifth, the drill-head L can be revolved around its horizontal axis, and, sixth, the drill-spindle M can be shifted in the direction of its longitudinal axis. The whole of these six motions cause a change in the position of the operating-tool, the adjustment of which can thus be effected with great rapidity. Adjustments first, second, and third correspond to movements of large extent, while fourth, fifth, and sixth serve to adjust in its final and exact position the tool already brought in proximity to the point to be operated on by the former motions.

Figs. 7, 8, and 9 show a modified form of my invention, by means of which the larger adjustments of the tubular arm D in a horizontal direction are effected automatically— i. e., derived from the main or driving gearing. Driving-spindle N is for this purpose provided over its whole length with a screw-thread. Bevel-wheel P, which imparts a rotary motion to N by means of a groove and feather, is bored large enough to run clear of the screw-thread. Cross-piece $p$ is provided with a hole through which passes a spindle $h$, the lower end of which carries a half-nut $h'$, whose internal thread fits that of spindle N. This half-nut must be capable of being raised (thrown out of gear) or lowered. In the drawings it is shown thrown into gear. Fig. 7 shows, by way of example, how this may be effected. The wall of the transverse support has cut in it a slot of step-like shape, through which a handle $h^2$, fitted on the end spindle $h$, protrudes. By means of this handle $h^2$ the spindle and half-nut can be rotated. If the handle is moved so as to come to rest in the upper part of the slot, the half-nut $h'$ is thrown out of gear. If, however, the said handle is resting on the lower step, as shown in Fig. 8, the half-nut $h'$ is in gear. The main or driving gearing must be arranged so as to give forward or backward motion. As soon as spindle N is rotated in either direction through the medium of spindle O and the bevel-wheels this spindle N (and with it radial arm D) is moved one way or the other owing to the half-nut $h'$ being in gear with its screw-thread. If the half-nut is thrown out of gear, spindle N merely imparts a rotary motion to the operating-tool.

Figs. 10, 11, and 12 represent a modification by means of which radial arm D is raised and lowered automatically. To actuate this device, the driving-gear must be arranged to work forward and backward. The bevel-wheel Q', revolving in bearings provided at the top of pillar A, has that portion of its hub which protrudes inside the pillar formed into a bevel-wheel gearing with another one $k$, journaled in the wall of the pillar. The outer end of the spindle of the latter bevel-wheel is fitted with a fast and a loose pulley, below which a belt-shifting bar X, worked, for instance, by a bell-crank and pull-rod, is arranged, Fig. 11. The wall of the pillar is at the lower end thereof fitted with a short spindle, on which revolves a pulley having a width equal to the aggregate widths of the aforesaid fast and loose pulleys and located immediately under them. The end of the short spindle which protrudes inside pillar A is fitted with a bevel-wheel $o$, gearing with another formed for the purpose in view on the upper end of socket $G^2$, which surrounds spindle F. In this case $G^2$ is not fixed to the foot of the pillar, but merely rests on washers of metal interposed between it and the foot of the pillar. A belt is run in the usual manner over the lower pulley and one of the upper ones. When this belt is on the loose pulley at the top of the pillar, the lower pulley and bevel-wheel $o$ are at a standstill, the latter holding socket $G^2$ fast. If spindle F is rotated by the device shown in Fig. 1, it is screwed up or down within the socket $G^2$, now held fast by bevel-wheel $o$. If now the belt is shifted onto the constantly-revolving upper fast pulley by means of the shifting-bar X, the lower pulley is thereby caused to revolve in a direction corresponding to that of the motion of the main or driving gearing. At the same time bevel-wheel o, which gears with socket $G^2$, causes it to revolve, thereby raising or lowering spindle F, which does not revolve for the time being.

In the modified form of my invention shown in Figs. 13 to 16 spindle N is driven direct by an electromotor V, arranged at the rear end of tubular arm D. In this case the screw-spindle $F^3$, which serves to raise and lower the cross-support E, is located in the top of the pillar, so that it is in this case unnecessary for it to extend below the level of the ground. The raising and lowering of the transverse support E, together with arm D, drill-head L, and electromotor V, are effected by means of spindle $F^3$, in combination with a pair of bevel-wheels $P^2$ $P^3$ and a coupling device. Bevel-wheel $P^3$ is mounted on a short spindle $F^4$, whose axis coincides with that of $F^3$. This spindle is attached to an arm inside a transverse support E. The end of spindles $F^3$ and $F^4$, which are exactly opposite each other, are of hexagonal shape. The hexagonal end of spindle $F^3$ is embraced by a socket $F^5$, the internal shape of which is likewise hexagonal. In the position shown the hexagonal head at the end of $F^4$ is disconnected from that of $F^3$ and simply revolves when spindle N is rotated. Socket $F^5$ is embraced by the ring-shaped end of a lever $F^6$, passing through a slot of step-like shape, Fig. 16. When the parts are not coupled, the lever rests on the top step. If, however, it is brought in contact with the bottom one, socket $F^5$ is shifted downward and embraces both hexagonal heads of spindles $F^3$ and $F^4$. The rotation of spindle N then causes spindle $F^3$ to revolve in unison and to screw up or down in the upper bevel-wheel, which acts as a nut. When spindles $F^3$ and $F^4$ are disconnected, the small vertical displacements are effected through the pair of bevel-wheels provided at the top of the pillar, these being revolved by hand sprocket wheel and chain. In this case the bevel-wheel on spindle $F^3$ acts as a fixed nut, and its rotation causes the forward or downward progress of spindle $F^3$.

Pillar A is provided at its lower end with a flange A' and rests on a disk $c^2$, provided with a central pin $c^3$ of large diameter, surmounted by a smaller one $c^4$. The vertical pressure is first of all taken up by $c^3$ and the raised rim of disk $c^2$, while pins $c^3$ and $c^4$ act as lateral guides. Disk $c^2$ rests on a bed-plate C', carried by a framing resting on wheels R' $R^2$, and is susceptible of a lateral displacement, so that the whole machine can be displaced in a direction perpendicular to the plane of the drawings—that is to say, to the direction of the travel of the truck supporting the machine—which is fixed in position where it is required by means of clamping-claws D' $D^2$, gripping the rails. Flange A' is furthermore provided with a ring B', provided with helical teeth, and serves to turn the machine around its vertical axis.

By making the machine susceptible of displacement on bed-plate or slide C' two further movements are added to the above-mentioned six ones for the purpose of bringing the tool into the required position. These two new movements are, first, the longitudinal displacement of the machine on rails, and, second, the displacement on slide C' in a direction at right angles to the longitudinal displacement. There are therefore in this form of my invention eight movements permitting to bring the operating-tool into the required exact position.

It is to be noted that in the various forms of my improved drilling-machine the pillar A and radial arm D intersect each other axially instead of crossing side by side, as in former constructions, thereby rendering the machine very compact and well balanced and at the same time greatly reducing the space occupied by it.

My radial drilling and thread-cutting machine serves, therefore, to drill, tap, ream out, screw in stay-bolts, drill holes inside pipes, and perform all such like operations in any direction. It has the special advantage that it can be quickly and accurately brought into the required position. It is therefore an eminently suitable machine for the construction of fire-boxes of the locomotive and marine types.

Having thus described my invention, I declare that what I claim is—

1. In a drilling-machine, the combination of a rotatable vertically-slotted pillar, a transverse support mounted thereon, means for adjusting the support vertically, a radial arm extending through the pillar and carried by and horizontally adjustable in the support, and a drill-head mounted on the arm, substantially as described.

2. In a drilling-machine, the combination of a vertical rotatable pillar having vertical slots in its opposite sides, a transverse support mounted thereon, means for adjusting the support vertically, a radial arm extending through the pillar and carried by and adjustable in the support, a drill-head mounted on the arm, a drill-spindle carried by the head and arranged at a right angle to the axis of the arm, and means within the arm for rotating the spindle, substantially as described.

3. In a drilling-machine, the combination of a vertical rotatable pillar having vertical slots in its opposite sides, means for rotating the pillar, an arm extending through said slots and adjustable both vertically and horizontally therein, means for adjusting the arm, and a drill-head mounted on the arm, substantially as set forth.

4. In a drilling-machine, the combination of a vertical pillar, means for rotating it, a radial arm carried by the pillar and bodily adjustable thereon both vertically and horizontally, means for adjusting the arm, a drill-head supported by the arm, horizontal and vertical drill-spindles carried by the head and respectively projecting in line with and at a right angle to the axis of the arm, and means for rotating the spindles, substantially as set forth.

5. In a drilling-machine, the combination of a vertical slotted pillar, means for rotating it, an arm extending through the pillar and intersecting it axially, means for adjusting the arm both vertically and horizontally independently of the pillar, a drill-head carried by the arm, horizontal and vertical drill-spindles supported by the drill-head, and means for rotating the spindles, substantially as set forth.

6. In a drilling-machine, the combination of a vertically and horizontally adjustable drill-head and its supporting and adjusting means, horizontal and vertical drill-spindles supported upon the drill-head and projecting in a line with and at right angles to the axis of the radial arm, and means for rotating the drill-spindles, substantially as described.

7. In a drilling-machine, the combination of a vertical rotatable pillar, a radial arm supported thereby and movable vertically and horizontally thereon, means for adjusting the arm vertically, a drill-head supported by the arm and adjustable horizontally and axially thereon, means for adjusting the head, a drill-spindle carried by the head and arranged at a right angle to the axis thereof, means for adjusting the spindle longitudinally in the head, a driving-shaft mounted in the arm, and gearing intermediate the spindle and shaft, substantially as set forth.

8. In a drilling-machine, the combination of a vertical rotatable pillar, an arm supported by and intersecting the pillar axially and movable vertically and horizontally thereon, means for adjusting the arm vertically, a drill-head having a toothed extension movable horizontally within the arm, a spur-wheel on the arm engaging the extension, worm-gearing for turning the head axially, a drill-spindle carried by the head at a right angle to the axis of the latter, means for adjusting the spindle longitudinally in the head, a driving-shaft, and gearing intermediate the latter and the spindle, substantially as set forth.

9. In a drilling-machine, the combination of a vertical rotatable slotted pillar, a transverse support mounted thereon, a screw for adjusting the support vertically, a radial arm extending through the pillar and carried by and movable lengthwise in said support, a drill-head mounted at one end of the arm and having an extension rotatable and horizontally movable within the arm, means for adjusting the drill-head on the arm, a drill-spindle arranged at a right angle to the axis of the head, means for adjusting the spindle lengthwise in the head, a second drill-spindle in line with the axis of the head, a driving-shaft, and gearing intermediate the latter and the spindles, substantially as set forth.

10. In a drilling-machine, the combination of a radial arm and its support, a rotatable and longitudinally-adjustable drill-head carried upon the arm, means for adjusting the drill-head, a drill-spindle supported upon the drill-head at an angle to the longitudinal axis thereof, a second drill-spindle supported in line with the axis of the drill-head, and means for imparting rotary movement to the drill-spindles, substantially as described.

11. In a drilling-machine, the combination of a bed-plate, a rotatable pillar mounted thereon and provided with a worm-wheel, a base-piece pivoted at one end to the bed-plate, a worm supported in bearings on the base-piece and adapted to engage the worm-wheel, a longitudinally-movable spindle mounted at the opposite end of the base-piece and adapted to engage the bed-plate when the worm and worm-wheel are in mesh, gearing intermediate the worm-shaft and spindle, and a hand-wheel, substantially as set forth.

12. The combination of a radial arm and a stationary pillar, a screw connected to the arm and extending through a threaded opening in the pillar, a gear carried by said screw, a second gear intermeshing with said gear carried upon a shaft journaled in the pillar, means for rotating the shaft, a drill-head carried upon the radial arm, a drill-spindle supported thereon, and means for rotating the drill-spindle, substantially as described.

In witness whereof I have hereunto signed my name in the presence of two subscribing witnesses.

PAUL THEODOR JOSEPH LANGBEIN.

Witnesses:
L. FRETTE,
MICHELE DE DRAGO.